United States Patent

[11] 3,618,119

[72] Inventor Juan A. Rodriguez
Boulder, Colo.
[21] Appl. No. 19,156
[22] Filed Mar. 13, 1970
[45] Patented Nov. 2, 1971
[73] Assignee Storage Technology Corporation
Boulder, Colo.

*Primary Examiner*—Terrell W. Fears
*Assistant Examiner*—Gary M. Hoffman
*Attorney*—Woodcock, Washburn, Kurtz & Mackiewicz

[54] COMPENSATION IN A MAGENTIC WRITE CIRCUIT
8 Claims, 5 Drawing Figs.

[52] U.S. Cl. .......... 346/74 M, 340/174.1 G
[51] Int. Cl. .......... G11b 5/02, G11b 5/44
[50] Field of Search .......... 346/74 M; 340/174.1 G, 174.1 H, 174.1 IB

[56] References Cited
UNITED STATES PATENTS
3,503,059 3/1970 Ambrico .......... 340/174.1 G

ABSTRACT: In a magnetic tape recording system, the write driver circuit has write compensation which drives the write coil with current which is initially high and which has an exponentially decaying waveform from the high current level to a lower current level. The write compensation is used with phase-encoded write current signals which have short duration transitions and longer duration transitions. The write compensation circuit includes a resistance-capacitance network having a time constant such that the exponential decay from the high current level to the lower current level is not completed during the short duration transitions in the write current signal so that the current through the write coil is initially higher after a longer transition than after a short transition.

COMPENSATION IN A MAGENTIC WRITE CIRCUIT

BACKGROUND OF THE INVENTION

This invention relates to magnetic tape and magnetic disc recording and more particularly to write compensation for such recording.

In phase-encoding recording on ½-inch standard computer tape, the detection of the recorded signal is often poor. Attempts have been made to compensate for this. One compensation technique is referred to as step current compensation. Upon transitions in the write current signal, the current through the write coil is initially high but is subsequently stepped to a lower value. Step current compensation operates satisfactorily but has the disadvantage of relatively expensive circuitry and a waveform which is rich in high-frequency harmonics.

Another compensation technique is to place a capacitor across the write coil. This peaks the current through the write coil. However, the peaking is dependent upon the inductance of the write head. This inductance can vary by as much as 100 percent from head to head. This requires that the capacitance be individually matched to each head.

SUMMARY OF THE INVENTION

In accordance with an important aspect of this invention, the current through the write coil decays from an initially high value to a lower current level. This smooth exponential decay achieves write current compensation with a circuit which is relatively inexpensive. Further, this type of write current compensation does not suffer from harmonics problems.

In one specific embodiment of the invention, write compensation is accomplished with a resistance-capacitance network connected in the emitter circuit of the output transistors. The write coil is connected between the collectors of the output transistors.

In accordance with another aspect of the present invention, the resistance-capacitance network in the emitter circuit of the output transistors has a time constant such that the exponential decay from the high current level to the lower current level is not completed during short duration transitions in the phase-encoded write current signal. Because of this, the current through the write coil is initially higher after a longer transition than after a short transition. This further helps to eliminate distortion on the long duration transitions where most of the distortion occurs.

The foregoing and other objects, features, and advantages of this invention will be better understood from the following more detailed description, drawings and appended claims.

THE DESCRIPTION OF THE DRAWINGS

Figure 1:
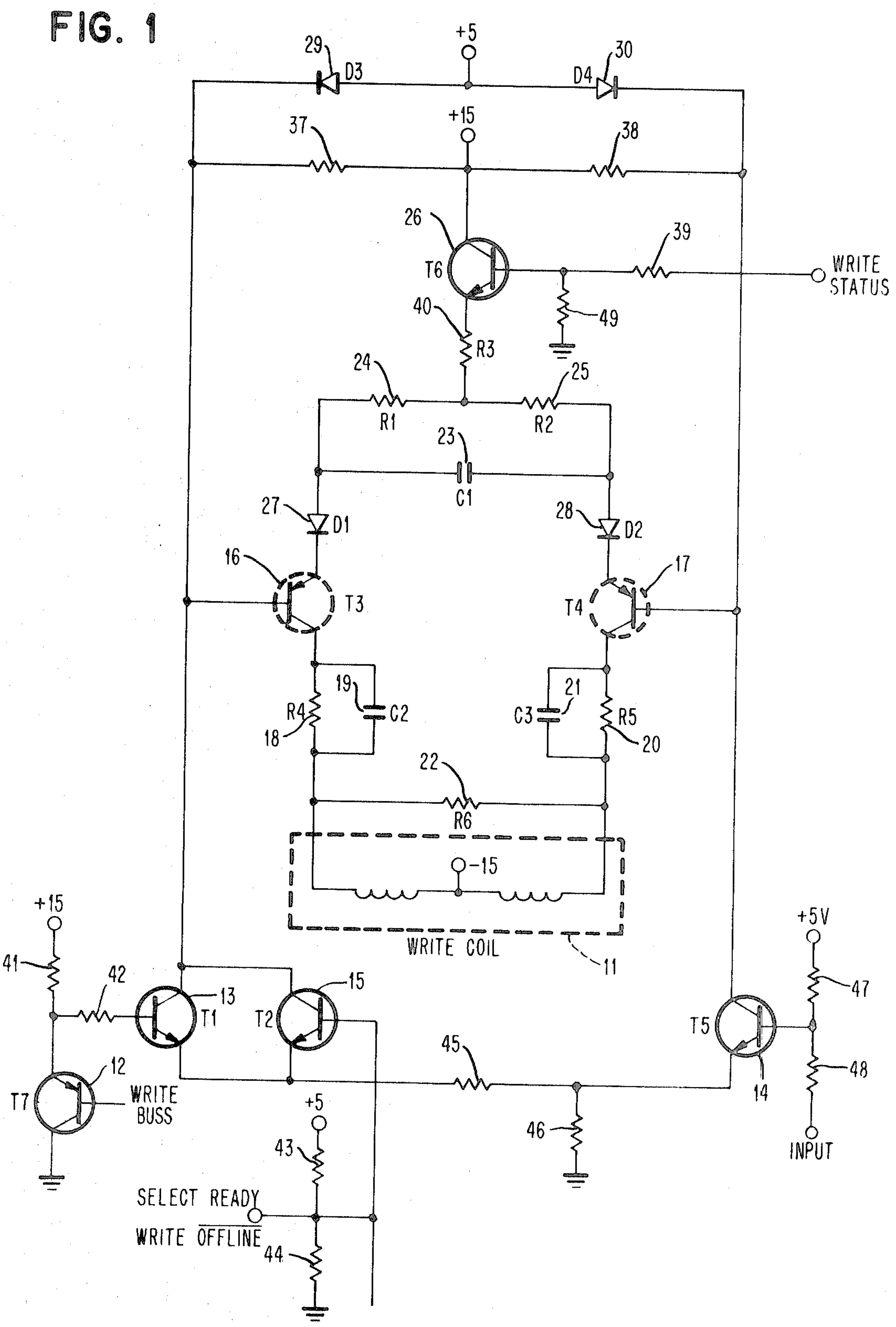
Figure 2A:
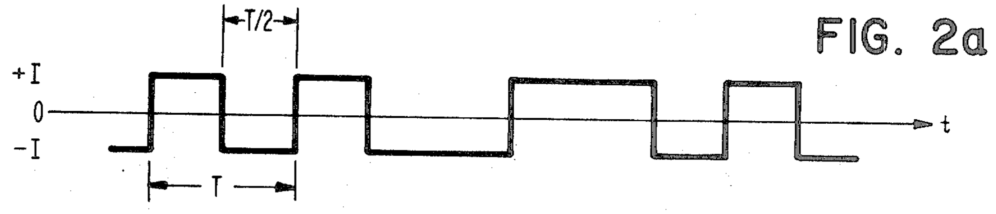
Figure 2B:
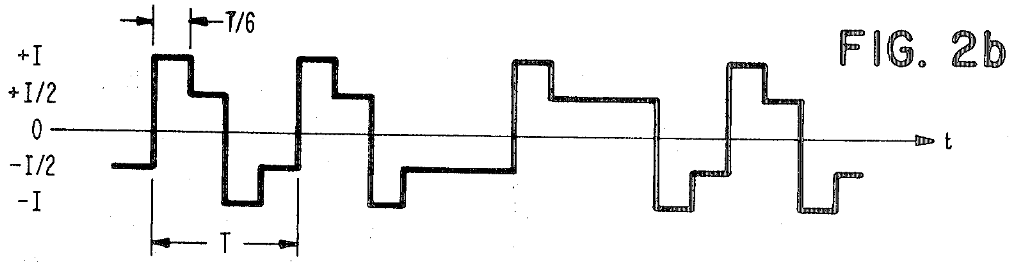
Figure 2C:
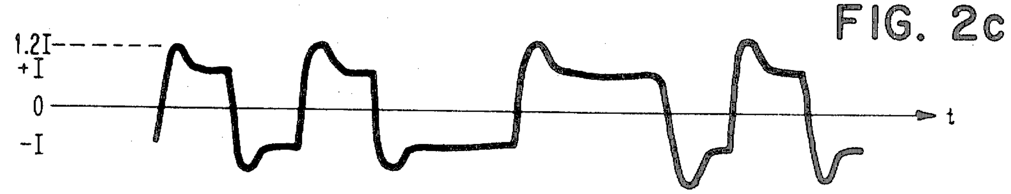

FIG. 1 shows the write driver circuit of this invention;

FIG. 2*a* shows normal write current;

FIG. 2*b* shows write current with step current compensation;

FIG. 2*c* shows a waveform of capacitor peaking compensation; and

Figure 2D:
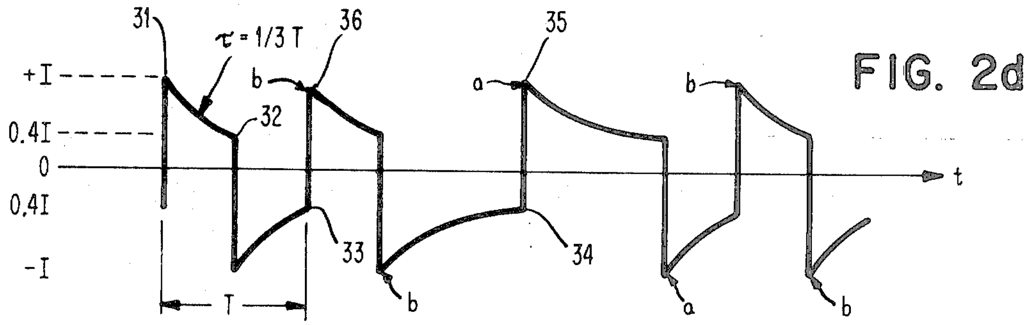

FIG. 2*d* shows the exponentially decaying compensation of the present invention.

DESCRIPTION OF THE PARTICULAR EMBODIMENT

Referring to FIG. 1 there is shown a write driver circuit for the center tapped write coil 11. A phase-encoded write voltage signal is applied to the emitter-follower transistor 12. The write voltage signal has a waveform of the type shown in FIG. 2*a* wherein information is phase encoded by long duration and shorter duration transitions. The signal is impressed on the write bus which is connected to the base of emitter follower 12 and to similar emitter followers in other write driver circuits. Commonly, seven other write drivers may be driven from the same bus. The emitter follower 12 minimizes the loading of the write bus. Also, the emitter follower transistor 12 is backed biased when power is removed from the write driver circuit, for example, during servicing. This prevents fluctuations which may be present in the circuit during troubleshooting from being impressed on the write bus.

The emitter follower 12 is connected to a current switch including the transistors 13 and 14. The emitter follower 12 is connected to the base of transistor 13. Degaussing and other off-line operations are performed by the transistor 14 when the transistor 15 is switched on. The transistor 15 is switched on when the drive circuit is not selected, or not ready, or not in write status, or off line. When transistor 15 is turned on, signals on the write bus are not effective, but signals applied to the base of transistor 14 are effective. For example, when degaussing is required, a square wave voltage signal from ground to +5 volts is applied to the base of transistor 14.

The current switch drives the output transistors 16 and 17. The write coil 11 is connected between the collectors of the output transistors 16 and 17. A network including resistor 18 and capacitor 19 is included in the collector circuit of transistor 16 to dissipate power after the inductive kick of the write coil 11 has decayed. A similar network including resistor 20 and capacitor 21 is included in the collector circuit of the output transistor 17. A damping resistor 22 is connected across the write coil.

One-half of the current in each complete excursion of the write drive signal is supplied through transistor 16; the other half is supplied through transistor 17.

When the transistor 16 or the transistor 17 is initially switched on, the current supplied to the write coil 11 is high, but it exponentially decays from this high current level to a lower current level. The time constant of the write compensation circuit including capacitor 23 and resistors 24, 25, and 40 is such that the exponential decay from the high current level to the lower level is not completed during short duration transitions in the write current signal. However, between longer duration transitions the decay is substantially completed. Therefore, the write drive current is higher after a longer duration transition.

The emitter current for the output transistors 16 and 17 is supplied through an emitter-follower 26. A write status signal is applied to the base of emitter-follower 26. The write status signal is at +15 volts when in the write status mode and at ground when the circuit is out of the write status mode. When out of write status mode, no current is supplied through emitter-follower 26 and through output transistors 16 and 17 to the write coil.

Diodes 27 and 28 prevent the application of voltages which might exceed the emitter-collector, emitter-base reverse breakdown voltages of transistors 16 and 17. Diodes 29 and 30 prevent saturation of the transistors 13 and 14.

The operation of the circuit of FIG. 1 is as follows. During a write operation, the inputs to transistors 14 and 15 are at ground. The write status input to transistor 26 is at +15 volts. The input to transistor 12 is the write data of the waveform shown in FIG. 2*a* with an amplitude of approximately ground to +3 volts. Transistor 12 drives the current switch including transistors 13 and 14. These in turn drive the output transistors 16 and 17 at whose emitters is the current-shaping network. The emitter voltage of transistor 26 determines the magnitude of the current.

The advantages of the present invention can be better understood with reference to the waveforms of FIGS. 2*a*–2*d*. FIG. 2*b* shows the step current compensation technique of the prior art. As previously mentioned, implementing this technique is relatively expensive and the step voltage is rich in high-frequency harmonics. These harmonics have such large amplitude that they must occur precisely in time, otherwise they will degrade the signal.

FIG. 2*c* shows the write current produced by the prior art capacitor peaking technique wherein the capacitor is connected across the drive coil. In this technique, the peaking is dependent on the inductance of the write head. This inductance can vary 50–100 percent and this makes some adjustment of the capacitor to match the inductance imperative.

The present invention produces the write current waveform of the type shown in FIG. 2*d*. Upon a transition in the write current signal, the current through the drive coil is initially at the high value 31. The current decays exponentially from this high current level to a lower current level 32.

This gradual change in current explains why records made in this manner do not vary greatly in output signal with variations in head parameters. That is, in this system the output signal detection is relatively insensitive to variations in head parameters. In one test, variations were simulated by varying the decaying time constant 50 percent without any significant change in the readback signal.

Note that at the termination of the short duration transition, for example at 33, exponential decay from the high current level to the lower current level has not been completed. On the other hand, during the longer duration transition the time constant is substantially fully recovered, as indicated at 34. Because of this, the write current amplitude at 35 is higher than the amplitude at 36. This is beneficial because it further helps eliminate distortion on the long read transitions, where most of the distortion occurs.

The following are typical circuit component values given by way of example only:

| | |
|---|---|
| transistors 12–15 | 2N3564 |
| transistors 16 and 17 | 2N2905 |
| resistors 18 and 20 | 270 ohms |
| capacitors 19 and 21 | 2,200 picofarads |
| resistor 22 | 1 k. ohms |
| capacitor 23 | 0.013 $\mu$f. |
| resistors 24 and 25 | 82 ohms |
| resistor 40 | 10 ohms |
| transistor 26 | 2N-3300 |
| diodes 27–30 | 1N-3064 |
| resistors 37 and 38 | 2 k. ohms |
| resistor 39 | 1 k. ohms |
| resistor 41 | 2 k. ohms |
| resistor 42 | 51 ohms |
| resistor 43 | 130 ohms |
| resistor 44 | 390 ohms |
| resistor 45 | 51 ohms |
| resistor 46 | 160 ohms |
| resistor 47 | 560 ohms |
| resistor 48 | 510 ohms |
| resistor 49 | 2 k. ohms |

While a particular embodiment of the invention has been shown and described, it will, of course, be understood the various modification may be made without departing from the principles of the invention. The appended claims are, therefore, intended to cover any such modification within the true spirit and scope of the invention.

What is claimed is:

1. In a system for recording on a magnetic medium including a write coil, means for driving said medium past said write coil, and means for generating a phase-encoded write current signal having transitions between a value of positive current and a value of negative current, a write driver circuit comprising:
   - at least one output transistor, the collector of said transistor being connected to said write coil,
   - means for applying said write current signal to the base of said transistor, and
   - a capacitor means connected in the emitter circuit of said transistor for driving said write coil with current which is initially high and which has an exponentially decaying waveform from said high current level to a lower current level upon transition of said write current signal between said positive and negative current levels.

2. The write driver circuit recited in claim 1 wherein said write current signal has short duration transitions and longer duration transitions, further comprising:
   - resistors in circuit with said capacitor, the circuit having a time constant such that the exponential decay from said high current level to the lower current level is not completed during said shorter duration transitions in said write current signal, the current through said write coil being initially higher after a longer transition than after a short transition.

3. The system recited in claim 1 wherein a plurality of write driver circuits are connected to a single write bus and wherein each write driver circuit further comprises an input emitter-follower transistor which minimizes loading of the write bus, said emitter-follower transistor being back biased when power is removed from said write driver circuit so that fluctuation in the circuits are not impressed on said write bus.

4. The system recited in claim 1 comprising a pair of output transistors, said write coil being connected between the collectors of said output transistors, reference potential being connected to a tap of said write coil.

5. The system recited in claim 4 further comprising:
   - a current switch including two transistors which are switched in conductivity by the transition in said write current signal, said current switch being connected to the bases of said output transistors.

6. The system recited in claim 5 wherein said write current signal is connected to the base of one transistor in said current switch and wherein a degaussing signal is selectively applied to the base of the other transistor in said switch.

7. The system recited in claim 4 wherein the emitter current for said output transistors is supplied through an emitter-follower, a write status signal being applied to the base of said emitter-follower so that no current is applied to said write coil when said write status signal indicates that said driver circuit is not the write status.

8. The system recited in claim 4 further comprising a resistance-capacitance network in the collector circuit of each output transistor to dissipate the power of the inductive kick of said write coil.

* * * * *